(12) United States Patent
Resconi et al.

(10) Patent No.: US 7,365,137 B2
(45) Date of Patent: Apr. 29, 2008

(54) MULTISTEP PROCESS FOR THE (CO) POLYMERIZATION OF OLEFINS

(75) Inventors: Luigi Resconi, Ferrara (IT); Giovanni Baruzzi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 248 days.

(21) Appl. No.: 10/482,877

(22) PCT Filed: Jul. 11, 2002

(86) PCT No.: PCT/EP02/07894

§ 371 (c)(1),
(2), (4) Date: Jan. 6, 2004

(87) PCT Pub. No.: WO03/008496

PCT Pub. Date: Jan. 30, 2003

(65) Prior Publication Data

US 2004/0242815 A1 Dec. 2, 2004

(30) Foreign Application Priority Data

Jul. 17, 2001 (EP) .................................. 01202727

(51) Int. Cl.
C08F 4/6592 (2006.01)
(52) U.S. Cl. .................. 526/116; 526/114; 526/118; 526/119; 526/124.3; 526/161; 526/127; 525/240
(58) Field of Classification Search ............... 526/114, 526/116, 118, 119, 124.3, 161, 127; 525/240
See application file for complete search history.

(56) References Cited

U.S. PATENT DOCUMENTS

| | | | | |
|---|---|---|---|---|
| 4,298,718 A | | 11/1981 | Mayr et al. ................. | 526/125 |
| 4,495,338 A | | 1/1985 | Mayr et al. ................. | 526/125 |
| 5,057,475 A | * | 10/1991 | Canich et al. .............. | 502/104 |
| 5,672,665 A | * | 9/1997 | Agapiou et al. ............. | 526/82 |
| 6,730,754 B2 | | 5/2004 | Resconi et al. | |
| 7,074,864 B2 | | 7/2006 | Resconi | |
| 7,241,903 B2 | | 7/2007 | Fritze et al. | |
| 2004/0132612 A1 | | 7/2004 | Resconi et al. | |
| 2004/0254315 A1 | | 12/2004 | Resconi | |

FOREIGN PATENT DOCUMENTS

| | | |
|---|---|---|
| EP | 0361493 | 4/1990 |
| EP | 0361494 | 4/1990 |
| EP | 0362705 | 4/1990 |
| EP | 0395083 | 10/1990 |
| EP | 0451645 | 10/1991 |
| EP | 0553805 | 8/1993 |
| EP | 0553806 | 8/1993 |
| EP | 076553 | 3/1997 |
| WO | 91/02012 | 2/1991 |
| WO | 92/00333 | 1/1992 |
| WO | 95/07942 | 3/1995 |
| WO | 96/02583 | 2/1996 |
| WO | 9611218 | 4/1996 |
| WO | 99/21899 | 5/1999 |
| WO | 9928381 | 6/1999 |
| WO | 00/11057 | 3/2000 |
| WO | 0053646 | 9/2000 |
| WO | 01/21674 | 3/2001 |
| WO | 01/46272 | 6/2001 |
| WO | 0144319 | 6/2001 |
| WO | 01/053360 | 7/2001 |
| WO | 01/53360 | 7/2001 |
| WO | 01/62764 | 8/2001 |
| WO | 0170878 | 9/2001 |
| WO | 02/092564 | 11/2002 |
| WO | 02/100908 | 12/2002 |
| WO | 02/100909 | 12/2002 |
| WO | 02/102811 | 12/2002 |
| WO | 03/000706 | 1/2003 |

OTHER PUBLICATIONS

L. Resconi et al., "Selectivity in Propane Polymerization with Metallocene Catalysts," *Chem. Rev.*, vol. 100(4), p. 1253-1345 (2000).

J. Randall, "A $^{13}C$ NMR Determination of the Comonomer Sequence Distributions in Propylene-Butene-1 Copolymers," *Macromolecules*, vol. 11(3), p. 592-597 (1978).

M. Kakugo et al. $^{a13}C$ NMR Determination of Monomer Sequence Distribution in Ethylene-Propylene Copolymers Prepared with S-TiCl$_3$-Al (C$_2$H$_6$)$_2$Cl; *Macromolecules*, vol. 15, p. 1150-1152 (1982).

* cited by examiner

*Primary Examiner*—Roberto Rabago
(74) *Attorney, Agent, or Firm*—William R. Reid

(57) ABSTRACT

A multistep process for the polymerization of one or more olefins comprising a first step of polymerizing one or more of said olefins in the presence of a catalyst of the Ziegler-Natta type, a step wherein the polymer obtained in the first step is contacted with a catalyst system comprising an half-sandwich metallocene compound, followed by a second polymerization step. The amount of homo- or copolymer of olefins produced in the first polymerization step is between 10% to 90% by weight of the total amount of polymer produced.

16 Claims, No Drawings

MULTISTEP PROCESS FOR THE (CO) POLYMERIZATION OF OLEFINS

This application is the U.S. national phase of International Application PCT/EP02/07894, filed Jul. 11, 2002.

The present invention relates to a multistep process for the polymerization of olefins, carried out in two or more reactors, using two different catalyst systems. The present invention further relates to new polymer blends obtainable by said process. Multistep processes for the polymerization of olefins, carried out in two or more reactors, are known from the patent literature and are of particular interest in industrial practice. The possibility of independently varying, in any reactors, process parameters such as temperature, pressure, type and concentration of monomers, concentration of hydrogen or other molecular weight regulator, provides much greater flexibility in controlling the composition and properties of the end product compared to single-step processes. Multistep processes are generally carried out using the same catalyst in the various steps/reactors. The product obtained in one reactor is discharged and sent directly to the next step/reactor without altering the nature of the catalyst. WO 96/02583, WO 96/11218 and WO 00/11057 describe multistep processes for the polymerization of olefins carried out with two different catalyst systems. In a first step an olefinic polymer with particular values of porosity is prepared in the presence of a titanium or a vanadium catalyst. In a second step, porous polymer is contacted with a metallocene compound and then a further olefin polymerization is carried out. Even if these applications list a plethora of metallocene compounds useful for the second step, they do not suggest the use of half-sandwich metallocene compounds. EP 763 553 describes a process which, by sequential polymerization, produces heterophasic thermoplastic and elastomeric composition containing both an elastomeric fraction produced with Ziegler-Natta catalysts and an elastomeric fraction produced with a metallocenic catalysts. The process described in said patent application foresees at least three stages, where the metallocenic catalyst operates in the presence of the Ziegler-Natta catalyst. WO 95/07942 relates to a gas-phase fluidized bed process for producing ethylene polymers having improved processability. Multiple reactors in series or parallel may be used to produce in-situ blended polymers. Each reactor can separately use a half-sandwich metallocene catalyst or a conventional Ziegler-Natta catalyst but at least a half-sandwich metallocene catalyst has to be present in at least one reactor. No specific description is present of a multistep process comprising a Ziegler-Natta catalyst and a half-sandwich metallocene catalyst. Furthermore, according to the description, in the second step the half sandwich catalyst is first supported on a carrier and then contacted with the polymer prepared in the first step.

Processes where the metallocene catalyst used in the last stage is not impregnated onto the polymer prepared in the first steps, achieve a less intimate mixture of the polymers obtained in the two steps, and the properties of the final blend are not satisfactory. Therefore, it would be desirable to find a process for obtaining a blend between polymers obtained from half sandwich metallocene catalysts and Ziegler-Natta catalysts that enhances the properties of both polymers. It has now been found a multistep process which makes possible to produce a wide range of olefin polymer compositions, working with a catalytic system containing half-sandwich metallocene compounds. Therefore, according to a first object, the present invention relates to a process for the polymerization of olefins of formula $CH_2=CHR$, wherein R is hydrogen or an alkyl, cycloalkyl or aryl radical with 1-20 carbon atoms, comprising the following steps:

a) a first step of polymerization in which one or more of said olefins is/are polymerized, in one or more reactors, in the presence of a catalyst comprising the product of reaction between an alkyl-Al compound and (i) a solid component comprising a compound of a transition metal MI selected from the group consisting of Ti and V, not containing $M^I$-$\pi$. bonds, and a halide of Mg in active form, or (ii) a Phillips catalyst, to produce an olefin homo- or copolymer;

b) a treatment step in which the product obtained in the first step of polymerization is contacted with a compound able to deactivate the catalyst present in the first polymerization step and thereafter it is contacted with a catalyst system comprising a compound of formula (I):

wherein:
Ti is titanium;
L is group bonded to the titanium atom through a $\pi$-bond;
Y is a moiety comprising nitrogen, phosphorus, sulfur or oxygen through which Y is covalently bonded to both Z and Ti;
Z is a moiety bridging L and Y,
X, same or different, are monovalent anionic moieties having up to 30 non-hydrogen atoms provided that, if X is an aromatic group, it is not bonded to Ti through a $\pi$-bond, optionally two X groups being covalently bonded together to form a divalent dianionic moiety having both valences bonded to Ti; and optionally with an activating cocatalyst;

c) a second step of polymerization in which one or more of said olefins are polymerized, in one or more reactors, in the presence of the product obtained in the treatment step b);

and wherein the amount of homo- or copolymer of olefin(s) produced in the first polymerization step a) is between 10% to 90% by weight preferably between 20% to 70% by weight, more preferably between 40% to 60% by weight of the total amount of polymer produced. The solid component used in the first step of polymerization a) can also comprise an electron-donor compound (internal donor). As a rule the internal donor is used when the solid component is used for preparing catalysts for the stereospecific polymerization of propylene, 1-butene and similar alpha-olefins, where a high stereospecificity is necessary to obtain polymers with an isotactic index higher than 90. The catalyst used in the first step of polymerization can also comprise another electron-donor compound (external donor).

When stereoregular polymers are produced in the first step of the multistep polymerization process of the present invention, for example polymers of propylene with high isotacticity index, the external donor is used for imparting the necessary stereospecificity to the catalyst. However, when diethers of the type described in Patent EP-A-361493 are used as internal donors, the stereospecificity of the catalyst is sufficiently high in itself and the external donor is not necessary. The halides of magnesium, preferably $MgCl_2$, in active form used as support for Ziegler-Natta catalysts, are widely known from the patent literature. U.S. Pat. No.

4,298,718 and U.S. Pat. No. 4,495,338 first described the use of these compounds in Ziegler-Natta catalysis. It is known from these patents that the halides of magnesium in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is shifted towards lower angles compared with that of the most intense line.

The compound of the transition metal $M^I$ is selected preferably from the group consisting of: halides of titanium, halogen-alcoholates of titanium, $VCl_3$, $VCl_4$, $VOCl_3$, halogen-alcoholates of vanadium. Among the titanium compounds, the preferred are $TiCl_4$, $TiCl_3$ and the halogen-alcoholates of formula $Ti(OR^I)_mX_n$ wherein $R^I$ is a hydrocarbon radical with 1-12 carbon atoms or a —$COR^{II}$ group wherein $R^{II}$ is a hydrocarbon radical with 1-12 carbon atoms, X is halogen and (m+n) is the valence of titanium. The catalytic component of the polymerization step a) is advantageously used in the form of spherical particles with average diameter between about 10 and 150 µm. Suitable methods for the preparation of said components in spherical form are described for example in Patents EP-A-395083, EP-A-553805, EP-A-553806, whose description relating to the method of preparation and to the characteristics of the products is herein incorporated for reference. Examples of internal donor compounds are ethers, esters, in particular esters of polycarboxylic acids, amines, ketones and 1,3-diethers of the type described in Patents EP-A-361493, EP-A-361494, EP-A-362705 and EP-A-451645. The alkyl-Al compound is generally selected from the trialkyl aluminum compounds such as for example triethyl-Al, triisobutyl-Al, tri-n-butyl-Al, tri-n-hexyl-Al, tri-n-octyl-Al. It is also possible to use mixtures of trialkyl aluminum with alkyl aluminum halides, alkyl aluminum hydrides or alkyl aluminum sesquichlorides such as $AlEt_2Cl$ and $Al_2Et_3Cl_3$. The external donor can be the same as or can be different from the internal donor. When the internal donor is an ester of a polycarboxylic acid, such as a phthalate, the external donor is preferably selected from silicon compounds of formula $R^{III}_2Si(OR^{III})_2$, wherein $R^{III}$, same or different, are alkyl, cycloalkyl or aryl radicals with 1-18 carbon atoms. Examples of such silanes are methylcyclohexyldimethoxysilane, diphenyldiinethoxysilane, methyl-t-butyldimethoxysilane, dicyclopentyldimethoxysilane. A particularly suitable class of catalyst are those described in WO 01/46272. The polymers obtained by using these catalysts contains a high content of the so called stereoblocks, i.e., of polymer fractions which, although predominantly isotactic, contain a not negligible amount of non-isotactic sequences of propylene units. In the conventional fractionation techniques such as the TREF (Temperature Rising Elution Temperature) those fractions are eluted at temperatures lower than those are necessary for the more isotactic fractions. Preferred compounds of formula (I) used in the treatment step b) are those of formula (II)

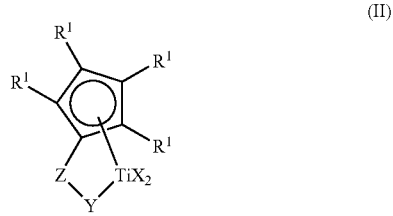

(II)

wherein:

Ti is a titanium atom;

X, same or different, are hydrogen atoms, halogen atoms, a —$R^2$, —$OR^2$, —$OCOR^2$, —$OSO_2CF_3$, —$SR_2$, —$NR^2_2$ and —$PR^2_2$ radicals, wherein $R^2$ is a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, two $R^2$ can also form a $C_4$-$C_7$ saturated or unsaturated ring; preferably X is halogen, $R^2$ or $OR^2$; more preferably X is halogen, methyl, phenyl, methoxy or phenoxy radical; Y is $NR^2$, $PR^2$, O or S, wherein $R^2$ is described above; preferably Y is selected from the group consisting of N-methyl, N-ethyl, N-n-propyl, N-isopropyl, N-n-butyl, N-t-butyl, N-phenyl, N-p-n-butyl-phenyl, N-benzyl, N-cyclohexyl and N-cyclododecyl radicals; more preferably Y is N-t-butyl; Z is selected from the group consisting of, $R^3_2Si$-$SiR^3_2$, $R^3_2C$-$CR^3_2$, $R^3_2Si$-$CR^3_2$, $R^3_2Si$ and $CR^3_2$ radicals, wherein $R^3$ is a hydrogen atom or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements; two $R^3$ can also form a $C_4$-$C_7$ saturated or unsaturated ring; Z is preferably selected from the group consisting of dimethylsilyl, diphenylsilyl, diethylsilyl, di-n-propyl-silyl, di-isopropylsilyl, di-n-butyl-silyl, di-t-butyl-silyl, di-n-hexylsilyl, ethylmethylsilyl, n-hexylmethylsilyl, cyclopentamethylenesilyl, cyclotetramethylenesilyl, cyclotrimethylenesilyl, methylene, dimethylmethylene and diethylmethylene radicals; more preferably, Z is dimethylsilyl, diphenylsilyl or dimethylmethylene radical; the groups $R^1$, same or different, are hydrogen atoms, halogen atoms or a linear or branched, saturated or unsaturated $C_1$-$C_{20}$ alkyl, $C_6$-$C_{20}$aryl or $C_7$-$C_{20}$ arylalkyl radicals, optionally containing heteroatoms belonging to groups 13-17 of the Periodic Table of the Elements; or two or more $R^1$ groups can also form a ring that can be saturated or unsaturated and can contain one or more heteroatoms belonging to groups 13-16 of the Periodic Table of the Elements, to form for example, fluorenyl, indenyl, tetrahydroindenyl, octahydroindenyl, azopentalenyl, dithieniecylopentadienl moiety, said rings can bear alkyl substituents. Preferred compounds belonging to formula (II) are those of formula (III):

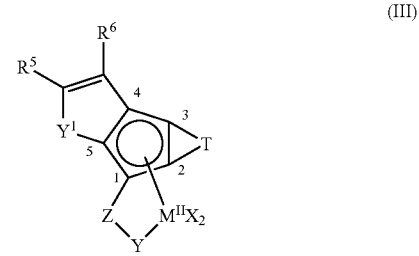

(III)

wherein Ti, X, Y and Z have the above indicated meaning;

$Y^1$ is $NR^2$, an oxygen atom (O), $PR^2$ or a sulfur atom (S); preferably $Y^1$ is $NR^2$ or S; more preferably it is $NCH_3$ or S; wherein $R^2$ has the above indicated meaning;

the groups $R^5$ and $R^6$, same or different, are hydrogen atoms, halogen atoms or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements; or $R^5$ and $R^6$ can also join to form a $C_4$-$C_7$ saturated or unsaturated ring; preferably $R^5$ and $R^6$ are hydrogen atoms or methyl, ethyl, n-propyl, isopropyl, n-butyl, t-butyl, phenyl, p-n-butyl-phenyl or benzyl radicals, or $R^5$ and $R^6$ form a condensed aromatic or aliphatic $C_4$-$C_7$ ring that can bear alkyl substituents;

T is a moiety of formula (IIIa) or (IIIb):

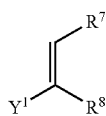

(IIIa)

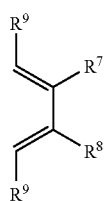

(IIIb)

wherein $Y^1$ has the above indicated meaning; being bonded to the cyclopenatdienyl group in position 2; the groups $R^7$, $R^8$ and $R^9$, same or different, are hydrogen atoms, halogen or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, or $R^9$ and $R^7$, $R^7$ and $R^8$ or $R^8$ and $R^9$ form together a condensed $C_4$-$C_7$ ring that can bear alkyl substituents. Particularly preferred complexes of formula (III) are those belonging to the below described subclasses (1), (2) and (3), having respectively formula (IV), (V) and (VI).

Class (1)

Complexes belonging to class (1) have the following formula (IV):

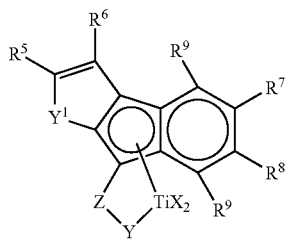

(IV)

wherein Ti, X, Y, $Y^1$, $R^5$, $R^6$, $R^7$, $R^8$ and $R^9$ have the above indicated meaning; atom; with the proviso that $R^5$ and $R^6$ do not form a condensed aromatic or aliphatic $C_4$-$C_7$ ring.

Preferably in the complexes of formula (IV):

$Y^1$ is N-methyl, N-ethyl or N-phenyl;

$R^5$ is a hydrogen atom, or a methyl, ethyl, propyl or phenyl radical; and $R^6$ is a hydrogen atom or methyl or phenyl radical; and $R^7$, $R^8$ and $R^9$ are hydrogen atoms; even more preferably $R^5$ is a methyl radical and $R^6$ is a hydrogen atom;

Class (2)

Complexes belonging to class (2) have the following formula (V):

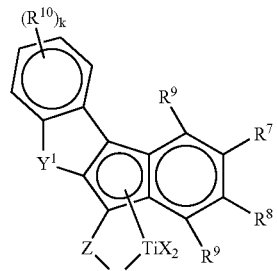

(V)

wherein Ti X, Y, $Y^1$, $R^5$, $R^6$, $R^7$, $R^8$ and $R^9$ have the above indicated meaning; k ranges from 0 to 4 and $R^{10}$ is a halogen atom or or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, or two vicinal $R^{10}$ groups form together a condensed aromatic or aliphatic $C_4$-$C_7$ ring.

Preferably in the complex of formula (V):

$Y^1$ is a N-methyl, N-ethyl or N-phenyl radical;

k is 0 or 1 and $R^{10}$ is a 2-methyl, 2-isopropyl and 2-tert-butyl radical;

$R^7$, $R^8$ and $R^9$ are hydrogen atoms;

Class (3)

Complexes belonging to class (3) have the following formula (VI):

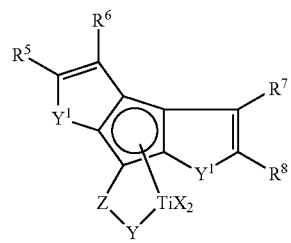

(VI)

wherein Ti, X, Y, $Y^1$, $R^5$, $R^6$, $R^7$ and $R^8$ have the above indicated meaning;

Preferably in the complexes of formula (VI):

two $Y^1$ are the same; more preferably they are $NR^2$ or S;

$R^5$ is a hydrogen atom or a methyl, ethyl, propyl or phenyl radical; and $R^6$ is a hydrogen atom or $R^5$ and $R^6$ form a condensed benzene ring that can bear alkyl substituents;

$R^7$ is a hydrogen atom and $R^8$ is a hydrogen atom or a methyl, ethyl, propyl or phenyl radical or $R^7$ and $R^8$ form a condensed benzene ring that can bear allyl substituents.

Compounds of formulas (I)-(VI) can be obtained according to procedures known in the art, for example compounds of formula (III) can be obtained according to the methods described in WO 01/53360 or EP 01201821.4. The polymerization step a) of the process of the present invention can be carried out in liquid phase or in gas phase, working in one or more reactors. The liquid phase can consist of an inert hydrocarbon solvent (suspension process) or of one or more olefins CH$_2$=CHR (liquid monomer process) wherein R is described above. Gas-phase polymerization can be carried out using the known fluidized-bed technique or working in conditions in which the bed is mechanically stirred. The gas-phase technology with a fluidized-bed is preferred. The treatment step b) is carried out advantageously in the following two steps:

I. first contacting the polymer produced in polymerization step a) with compounds that are able to deactivate the catalyst used in said step a); and then
II. contacting the product obtained in I. with a solution comprising a compound of formula (I) and optionally an activating cocatalyst in hydrocarbon solvents such as, for example, benzene, toluene, heptane, hexane, liquid propane and the like.

Examples of compounds that can be used in step I. are compounds having the general formula $A_{g-1}QH$ in which A is hydrogen or a hydrocarbon group having from 1 to 10 carbon atoms, Q is O, N, or S, and g is the valency of Q. Non-limitative examples of such compounds are represented by alcohols, thioalcohols, mono- and di-alkylamines, NH$_3$, H$_2$O and H$_2$S. Preferred compounds are those in which Q is O and among these, a particularly preferred compound is water. Other examples of compounds that can be used in treatment step (a) are CO, COS, CS$_2$, CO$_2$, O$_2$ and acetylenic or allenic compounds.

Treatment I., in which these deactivating compounds are put in contact with the polymer produced in step a), can be effected in various ways. In one of these, the polymer is brought into contact, for a time ranging from 1 minute to some hours, with a hydrocarbon solvent that contains the deactivating compound in solution, suspension or dispersion. An example of dispersion of the deactivating compound in a hydrocarbon solvent is represented by humidified hexane. At the end of treatment I. the liquid is removed and the polymer undergoes treatment II.

Preferably in step II the solution of the compound of formula (I) further contains one or more activating cocatalysts. Suitable activating cocatalyst according to the process of the invention are alumoxanes or compounds able to form an alkyl metallocene cation. Alumoxanes can be obtained by reacting water with an organo-aluminium compound of formula H$_j$AlU$_{3-j}$ or H$_j$Al$_2$U$_{6-j}$, where U substituents, same or different, are hydrogen atoms, C$_1$-C$_{20}$-alkyl, C$_3$-C$_{20}$-cyclalkyl, C$_6$-C$_{20}$-aryl, C$_7$-C$_{20}$-alkylaryl or C$_7$-C$_{20}$-arylalkyl, optionally containing silicon or germanium atoms with the proviso that at least one U is different from halogen, and j ranges from 0 to 1, being also a non-integer number. In this reaction the molar ratio of Al/water is preferably comprised between 1:1 and 100:1. The molar ratio between aluminium and the metal of the metallocene is comprised between about 10:1 and about 20000:1, and more preferably between about 100:1 and about 5000:1.

The alumoxanes used in the catalyst according to the invention are considered to be linear, branched or cyclic compounds containing at least one group of the type:

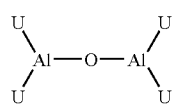

wherein the substituents U, same or different, are described above.

In particular, alumoxanes of the formula:

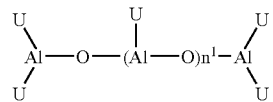

can be used in the case of linear compounds, wherein $n^1$ is 0 or an integer from 1 to 40 and the substituents U are defined as above, or alumoxanes of the formula:

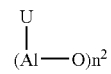

can be used in the case of cyclic compounds, wherein $n^2$ is an integer from 2 to 40 and the U substituents are defined as above. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in WO 01/21674 in which the alkyl and aryl groups have specific branched patterns.

Non-limiting examples of aluminium compounds according to said international applications are:

tris(2,3,3-trimethyl-butyl)aluminium, tris(2,3-dimethyl-hexyl)aluminium, tris(2,3-diethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula D$^+$E$^-$, wherein D$^+$ is a Brønsted acid, able to donate a proton and to react irreversibly with a substituent X of the metallocene of formula (I) and E⁻ is a compatible anion, which is able to stabilize the active catalytic species originating from the reaction of the two compounds, and which is sufficiently labile to be able to be removed by an olefinic monomer. Preferably, the anion E⁻ comprises of one or more boron atoms. More preferably, the anion E⁻ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAR_3P$ wherein P is a substituted or unsubstituted pyrrol radicals. These compounds are described in PCT/EP01/01467. all these compounds containing boron atoms can be used in a molar ratio between boron and the metal of the metallocene comprised between about 1:1 and about 10:1; preferably 1:1 and 2.1; more preferably about 1:1.

Further compounds that can be used are those of formula RM'—O—M'R, R being an alkyl or aryl group, and M' is selected from an element of the Group 13 of the Periodic Table of the Elements (new IUPAC version). Compounds of this type are described, for example, in the International patent application WO 99/40129.

Non limiting examples of compounds of formula $D^+E^-$ are:

Triethylarmmoniumtetra(phenyl)borate,

Tributylammoniumtetra(phenyl)borate,

Trimethylammoniumtetra(tolyl)borate,

Tributylammoniumtetra(tolyl)borate,

Tributylammoniumtetra(pentafluorophenyl)borate,

Tributylammoniumtetra(pentafluorophenyl)aluminate,

Tripropylammoniumtetra(dimethylphenyl)borate,

Tributylammoniumtetra(trifluoromethylphenyl)borate,

Tributylammoniumtetra(4-fluorophenyl)borate,

N,N-Dimethylaniliniumtetra(phenyl)borate,

N,N-Diethylaniliniumtetra(phenyl)borate,

N,N-Dimethylaniliniumtetrakis(pentafluorophenyl)boratee,

N,N-Dimethylanilinlumtetrakis(pentafluorophenyl)aluminate,

Dipropyl)ammoniumtetrakis(pentafluorophenyl)borate,

Di(cyclohexyl)ammoniumtetrakis(pentafluorophenyl)borate,

Triphenylphosphoniumtetrakis(phenyl)borate,

Triethylphosphoniumtetrakis(phenyl)borate,

Diphenylphosphoniumtetrakis(phenyl)borate,

Tri(methylphenyl)phosphoniumtetrakis(phenyl)borate,

Tri(dimethylphenyl)phosphoniumtetrakis(phenyl)borate,

Triphenylcarbeniumtetrakis(pentafluorophenyl)borate,

Triphenylcarbeniumtetrakis(pentafluorophenyl)aluminate,

Triphenylcarbeniumtetrakis(phenyl)aluminate,

Ferroceniumtetrakis(pentafluorophenyl)borate,

Ferroceniumtetrakis(pentafluorophenyl)aluminate.

Triphenylcarbeniurmtetrakis(pentafluorophenyl)borate,

N,N-Dimethylaniliniumtetrakis(pentafluorophenyl)borate.

Step II. can be effected by suspending the polymer produced in step a) in an hydrocarbon solvent contained dissolved therein the compound of formula (I) and optionally one or more activating cocatalyst, generally working at temperature between 0 and 100° C., preferably between 10 and 60° C., and removing the solvent at the end of the treatment. Alternative way is to contact the polymer produced in step a) with a solution of the compound of formula (I) containing the minimum quantity of solvent for keeping said compound in solution.

Step II. can be conveniently carried out in a loop reactor in the gas-phase, in which the polymer produced in the first step of polymerization (a) is circulated by a stream of inert gas. Solutions of the compound of formula (I) are fed, for example with a sprayer, to the loop reactor in the gas phase, obtaining a free-flowing product at the end of the treatment. A process of this type is described in WO 01/44319. The quantity of compound of formula (I), expressed as metal, contained in the product obtained from step b), can vary over a wide range depending on the compound of formula (I) used and on the relative quantity of product that it is desired to produce in the various steps. Generally this quantity is between $1 \cdot 10^{-7}$ $5 \cdot 10^{-3}$ g of metal Ti/g of product, preferably between $5 \cdot 10^{-7}$ and $5 \cdot 10{-4}$, more preferably between $1 \cdot 10^{-6}$ and $1 \cdot 10^{-4}$. The second step of polymerization (c) can be carried out in liquid phase or in gas phase, working in one or more reactors. The liquid phase can consist of an inert hydrocarbon solvent (suspension process) or of one or more olefins $CH_2=CHR$ (liquid monomer process). Gas-phase polymerization can be carried out in reactors with a fluidized bed or with a mechanically-stirred bed. Preferably step (c) is carried out in a gas-phase. During said step (c), it is convenient to feed, to the polymerization reactor, an alkyl-Al compound selected from compound of formula $H_jAlU_{3-j}$ or $H_jAl_2U_{6-j}$ wherein U and j are described above, or aluminoxane compounds described above. Compounds of formula $H_jAlU_{3-j}$ or $H_jAl_2U_{6-j}$ can preferably be fed to polymerization step (c) when treatment (II) in step (b) is carried out in the absence of $H_jAlU_{3-j}$ or $H_jAl_2U_{6-j}$ compounds. The catalyst of step c) is particularly advantageous in propylene polymerization, wherein they give substantially amorphous propylene polymers with high activities; when the titanium complexes are used as catalysts in the process, the obtained polypropylene has predominantly syndiotactic structure.

Polymerization step c) is preferably carried out in one or more reactors in the gas-phase, with a fluidized-bed. Other technologies (for example suspension polymerization or gas-phase polymerization with mechanically stirred bed) can be used, gas phase polymerization is preferred. The process is preferably carried out continuously, working in both steps of polymerization (a) and (c) in gas-phase fluidized-bed reactors and effecting step (b) in a gas-phase loop reactor. Polymerization step a) is preferably preceded by a step of prepolymerization in which propylene or its mixtures with ethylene and/or $CH_2=CHR$ olefins are polymerized in the presence of the catalyst described in a) in a quantity of between 5 and 500 g/g catalyst. The porosity (expressed as percentage of voids) of the polymer produced in the first step of polymerization (a) is preferably greater than 15% and more preferably greater than 20%. The distribution of pore radius is such that more than 40% of the porosity is due to pores with diameter greater than 10000 Å. Preferably, and for high values of porosity, more than 90% of the porosity is due to pores with diameter greater than 10000 Å. When the polymer is polypropylene, the contents of units derived from ethylene and/or from the $CH_2=CHR$ olefin is less than 20% by mol, content of units derived from propylene greater than 80% by mol and insolubility in xylene greater than 60% by weigth. Preferably the polymer obtained in step a) is a homopolymer of propylene with high isotacticity index, or a crystalline copolymer of propylene that has a content by weight of units derived from ethylene and/or from $CH_2=CHR^{III}$ olefin wherein $R^{III}$ is hydrogen or a $C_2-C_{20}$alkyl radical, below 5% by mol. More preferably the polymer of step a) is isotactic polypropylene optionally containing from 0.1 to 5% by mol of units derived from ethylene and/or from $CH2=CHR^{III}$ olefin wherein $R^{III}$ is hydrogen or a $C_2-C_{20}$ alkyl radical, having a pentads content (mmmm) higher than 60% more preferably higher than 80% even more preferably higher then 90%. Particularly preferred is the polypropylene obtained according to the process described in WO01/46272. The polymers obtained by using these catalysts contains a high content of the so called stereoblocks, i.e., of polymer fractions which, although predominantly isotactic, contain a not negligible amount of non-isotactic sequences of propylene units. In the conventional fractionation techniques such as the TREF (Temperature Rising Elution Temperature) those fractions are eluted at temperatures lower than those are necessary for the more isotactic fractions. The polymer produced in step c) is a substantially amorphous olefin (co)polymer having predominantly syndiotactic structure. The syndiotacticity of a polyolefins can be conveniently defined by the percent content of rr triads, as described in L. Resconi et al, Chemical Reviews, 2000, 100, 1253. Polymers of propylene obtained in step c) optionally containing from 0.1 to 5% by mol of units derived from an aipha-olefin of formula $CH_2=CHR^{III}$, wherein $R^{III}$ is hydrogen or a $C_2-C_{20}$ alkyl radical, typically have triad contents in the range 60-80% by mol, more preferably 65-75% by mol. Their syndiotacticity is not high enough to produce substantial crystallinity (as measured by DSC), but high enough to generate resiliency in the polypropylene. Their melting enthalpy ($\Delta Hf$) is generally lower than about 20 J/g and preferably lower than about 10J/g. Syndiotactic amorphous polypropylene obtained in step c) is described in WO01/53360. In step c) of the process of the present invention it is also possible to produce propylene-based copolymers, wherein suitable comonomers are ethylene, alpha-olefins such as 1-butene, 1-pentene, 1-hexene, 4-methyl-1-pentene, and/or non-conjugated diolefins such as 1,4-hexadiene, 1,5-hexadiene, 2-methyl-1,5-hexadiene, 7-methyl-1,6-octadiene, 1,7-octadiene, and the like. Ethylene-based polymers, such as polyethylene, ethylene/propylene, ethylene/1-butene, ethylene/propylene/diene elastomers, ethylene/alpha-olefin copolymers, e.g. ethylene/1-butene, ethylene/1-hexene, ethylene/1-octene, that is linear low density polyethylenes or plastomers can also be prepared in step c). The preferred ranges of composition of the copolymer prepared in step c) depend on the type of polymer desired, and on the type of polymerization process employed. For example, in the case of ethylene/propylene elastomers the content of propylene ranges from 20 to 80 wt %, preferably from 70 to 30 wt %. In ethylene/propylene/diene elastomers the content of the diene, which preferably is ethylidenenorbornene or 1,4-hexadiene, ranges from 0.5 to 5 wt %. In the case of ethylene/1-butene, ethylene/1-hexene or ethylene/1-octene copolymers the content of comonomer ranges from 1 to 50 wt %, preferably from 2 to 20 wt %. Preferred polymers obtained in step c) are polypropylene homopolymer or copolymers of propylene with ethylene, wherein the ethylene contents can vary from 0.1% to 35% by mol, preferably from 0.1% to 10% by mol. The molecular weight of the polymers can be varied by changing the polymerization temperature or the type or the concentration of the catalyst components, or by using molecular weight regulators, such as hydrogen, as well-known in the state of the art; the molecular weight of the propylene-based polymers may be also easily controlled by copolymerizing small amounts of ethylene. A further object of the present invention is a reactor blend obtainable by the process of the present invention comprising:

The following examples are reported for illustrative and not limiting purposes.

General Procedures and Characterizations

All operations were performed under nitrogen by using conventional Schlenk-line techniques. Solvents were purified by degassing with $N_2$ and passing over activated (8 hours, $N_2$ purge, 300° C.) A1203, and stored under nitrogen. The cocatalyst was a commercial MAO from Witco AG (10% wt solution in toluene).

$^{13}$C-NMR

Carbon spectra were obtained using a Bruker DPX-400 spectrometer operating in the Fourier transform mode at 120° C. at 100.61 MHz. The samples were dissolved in $C_2D_2Cl_4$. The peak of the mmmm pentad in the $^{13}$C spectra (21.8 ppm) was used as a reference. The carbon spectra were acquired with a 90° pulse and 12 seconds of delay between pulses. About 3000 transients were stored for each spectrum. The ethylene content was determined according to M. Kakugo, Y. Naito, K. Mizunuma, T. Miyatake, Macromolecules 1982, 15, 1150. The 1-butene content was determined from the diad distribution, from the S. carbons, as described in J. C. Randall, Macromolecules 1978, 11, 592.

Viscosity Measurements

The intrinsic viscosity (I.V.) was measured in tetrahydronaphtalene (THN) at 135° C.

The polymer molecular weights were determined from the viscosity values.

DSC Analysis

Melting point and heat of fusion measurements were carried out on a Perkin Elmer DSC 7 instrument by heating the sample from 25° C. to 200° C. at 10 ° C./min, holding for 2 min at 200° C., cooling from 200° C. to 25° C. at 10° C./min, holding for 2 min at 25° C., heating from 25° C. to 200° C. at 10° C./min. The reported values are those determined from the second heating scan.

$T_g$ values were determined on a DSC30 Mettler instrument equipped with a cooling device, by heating the sample from 25° C. to 200° C. at 20° C./min, holding for 10 min at 200° C., cooling from 200° C. to –140° C., holding for 2 min at –140° C., heating from –140° C. to 200° C. at 20° C./min. The reported values are those determined from the second heating scan.

Preparation of Half Sandwich Compounds

Me2Si(Me4Cp)(NtBu)TiCl$_2$ (C-1) was purchased from Witco AG. dimethylsilyl(tert-butylamido)(N-methyl-2-methyl-5,6-dihydroindeno[2,1-b]indol-6-yl)dimethyl titanium (B-1)

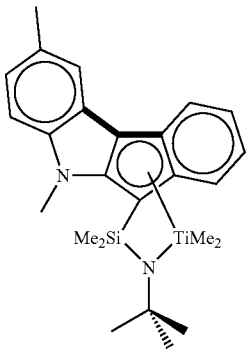

was prepared according to example 1 of WO 01/53360. dimethylsilyl(tert-butylamido)(N-methyl-2-methyl-1,8-dihydroindeno[2,1-b]pyrrol-6-yl)dimethyl titanium (B-3)

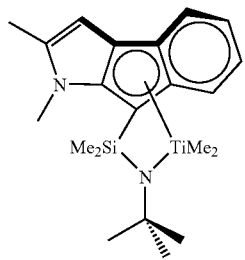

was prepared according to example 3 of WO 01/53360 dimethylsilyl(tert-butylamido)(N-ethyl-5,6-dihydroindeno[2,1-b]indol-6-yl)dimethyl titanium (B-4)

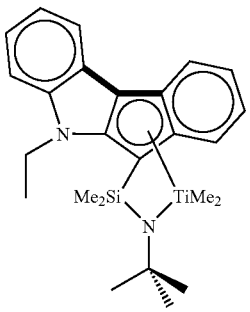

was prepared according to example 4 of WO 01/53360

EXAMPLE 1

Polymerization Step a)

Step a) was carried out by using the catalyst prepared according to example 3 of EP 395083. The polymerization was carried out according to the general procedure for propylene polymerization described in the same documents. Two isotactic propylene polymers (iPPa and iPPb) having the characteristics indicated in table 1 were obtained:

TABLE 1

| properties | iPPa | iPPb |
|---|---|---|
| XSRT (% wt) | 2.3 | n.d. |
| Part. diam. (sieved) | 500-2800 | 1400-2800 |
| Poured Bulk Density | 0.302 | 0.303 |
| Surface area (m2/g)(a) | 0.7 | 0.5 |
| Vp (pore volume, mL/g)(a) | 0.678 | 0.701 |
| v/v % (% voids) (a) | 37.8 | 37.7 |
| <R> (average part. radius, μ)(a) | 10.37 | 15,6 |
| Tm (° C.) | 162 | 162 |
| ΔH (J/g) | 114 | 100 |
| Tc (° C.) | 115 | 111 |
| MFR(L) | 34 | 7.7 |
| I.V. (dL/g) | 1.26 | 1.70 |
| Mw | 183 100 | — |
| Mn | 20 200 | — |
| Mw/Mn | 9.1 | — |
| mmmm | 96.1 | — |
| mm | 97.0 | — |
| rrrr | 0.5 | — |
| rr | 1.4 | — |

(a) Hg porosimetry (method Carlo Erba).

EXAMPLES 2-16

Step b) and Step c)

In a 4.25-L stainless-steel stirred reactor at 30° C. in a propane atmosphere were charged the polymer obtained in step a), 300 g of propane, then, by means of nitrogen overpressure, 4 mL of a 0.5 molar hexane solution of TIBA (which is not considered in the reported values of Al/Ti ratios reported in Table 3), and, after 5 minutes, the catalyst/cocatalyst mixture. The catalyst/cocatalyst mixture is prepared by dissolving the catalyst indicated in table 3 with MAO (Witco, toluene solution, 100 g/L), then adding a 0.5 M TIBA solution in hexane, and, if the total volume was too low to make the solution manageable, additional toluene was added up to a volume of 12 mL. The amounts used in the different polymerization experiments are listed in the following table 2:

TABLE 2

| Ex | catalyst type (mg) | MAO (mmol Al) | TIBA (mmol) | total volume (added toluene) |
|---|---|---|---|---|
| 2 | B-3 (12) | 3.1 | 3.1 | 12 (5.0) |
| 3 | B-4 (12) | 4.1 | 4.1 | 12 (1.4) |
| 4 | C-1 (15) | 4.1 | 4.1 | 12 (1.4) |
| 5 | B-3 (8) | 3.1 | 3.1 | 12 (5.0) |
| 6 | B-3 (10) | 3.9 | 3.9 | 12 (5) |
| 7 | B-4 (10) | 3.4 | 3.4 | 12 (1.4) |
| 8 | B-4 (12) | 4.1 | 4.1 | 12 (1.4) |
| 9 | C-1 (20) | 5.5 | 5.5 | 12 (none) |
| 10 | C-1 (20) | 5.5 | 5.5 | 12 (none) |
| 11 | B-3 (10) | 5.15 | 5.15 | 13 (none) |
| 12 | B-3 (8) | 4.1 | 4.1 | 12 (1.4) |
| 13 | B-3 (10) | 5.15 | 5.15 | 13 (none) |
| 14 | B-3 (10) | 5.15 | 5.15 | 13 (none) |
| 15 | C-1 (10) | 13.6 | 0 | 8 (4) |
| 16 | B-4 (15) | 10.3 | 3.4 | 13 (none) |

The reactor content is stirred at 40° C. for 10 min, then propane is vented in 5 min leaving a residual pressure of 4.3 bar-g at 30° C. The reactor is heated up to the reaction temperature in 4 min, while feeding the monomers in the amounts specified in Table 3, up to a pressure of 20 bar-g. When only propylene is polymerized, the reactor is purged with propylene to remove all propane, and propylene is then pressurized into the reactor up to a pressure of 20 bar-g at 80° C. When ethylene/1-butene are copolymerized (examples 5-11), propane is vented down to a residual pressure of 0 bar-g, and a 85/15 or 65/35 ethylene/1-butene mixtures are then pressurized into the reactor up to a pressure of 14 bar-g at 80° C., then temperature and pressure are maintained constant for the time required for the uptake of the amount of monomers reported in Table 3, the monomers are vented, and the polymer collected and dried in a vacuum oven at 70° C. for 2 hours. Polymerization data are reported in table 3. Characterization of polymers obtained in examples 11, 15 and 16 is reported in table 4, Fractionation data of polymers obtained in examples 12, 13 and 14 are reported in table 5.

EXAMPLE 17

Step b and Step c)

In a 4.25-L stainless-steel stirred reactor at 30° C. in a propane atmosphere were charged 102 g of the propylene polymer iPPa, obtained as described above, followed by 300 g of propane, 4 ml of a 0.5 M hexane solution of TIBA by means of nitrogen overpressure as a scavenger.

After 5 min stirring, 12 mL of a toluene/hexane solution containing 8 mg of B-3, 4.11 mmol MAO, and 4.11 mmol of TIBA. The reactor is stirred for 10 minutes at 40° C., then the reactor is vented to 0.5 bar-g (the inner reactor temperature drops to 30-35° C.). The reactor is flushed 3 times with propylene gas, then propylene gas is charged while heating the reactor to 80° C. up to 20 bar-g (in 5 min). Propylene is continuously fed to maintain both temperature and pressure constant. 75 g of propylene are added in 10 min, then propylene is vented to 0.5 bar-g, then a mixture of ethylene (50 g) and propylene (38 g) to a pressure of 14 bar-g (in 4 min) maintaining the temperature at 80° C. A 65/35 wt % (74/26 mol %) mixture of ethylene and propylene (48 g $C_2$ and 25 g $C_3$) was fed into the reactor in 100 min at 80° C. and 14 bar-g. The reactor is then vented, the spherical polymer (272 g total) is dried under vacuum at 70° C. for 2 hours.

TABLE 3

| Ex. | CAT Type | CAT mg | Al/Zr MAO | Al/Zr TIBA | T °C. | P bar-g | Time min | polym. step a) type | polym. step a) g | Initial gas phase composition $C_2^-$ wt % | Initial gas phase composition $C_3^-$ wt % | Initial gas phase composition $C_3^+$ wt % |
|---|---|---|---|---|---|---|---|---|---|---|---|---|
| 2 | B-3 | 12 | 100 | 100 | 80 | 20 | 26 | iPPb | 101 | 30 | 30 | 40 |
| 3 | B-4 | 12 | 150 | 150 | 80 | 20 | 24 | iPPa | 105 | 30 | 30 | 40 |
| 4 | C-1 | 15 | 100 | 100 | 80 | 20 | 51 | iPPb | 150 | 30 | 30 | 40 |
| 5 | B-3 | 8 | 150 | 150 | 80 | 14 | 44 | iPPa | 100 | 60 | 30* | 10 |
| 6 | B-3 | 10 | 150 | 150 | 80 | 14 | 48 | iPPa | 102 | 40 | 52* | 8 |
| 7 | B-4 | 10 | 150 | 150 | 80 | 14 | 120 | iPPa | 99 | 60 | 30* | 10 |
| 8 | B-4 | 12 | 150 | 150 | 80 | 14 | 44 | iPPa | 90 | 60 | 52* | 8 |
| 9 | C-1 | 20 | 200 | 200 | 80 | 14 | 90 | iPPa | 150 | 60 | 30* | 10 |
| 10 | C-1 | 20 | 200 | 200 | 80 | 14 | 120 | iPPa | 152 | 40 | 52* | 8 |
| 11 | B-3 | 10 | 200 | 200 | 80 | 20 | 54 | iPPa | 151 | — | 100 | — |
| 12 | B-3 | 8 | 200 | 200 | 80 | 20 | 60 | iPPa | 200 | — | 100 | — |
| 13 | B-3 | 10 | 200 | 200 | 80 | 20 | 69 | iPPa | 150 | — | 100 | — |
| 14 | B-3 | 10 | 200 | 200 | 80 | 20 | 105 | iPPa | 120 | — | 100 | — |
| 15 | C-1 | 10 | 500 | — | 80 | 20 | 15 | iPPa | 150 | — | 100 | — |
| 16 | B-4 | 15 | 300 | 100 | 80 | 20 | 50 | iPPa | 150 | — | 100 | — |

| Ex. | Initial gas phase composition $C_2^-$ g | Initial gas phase composition $C_3^-$ g | $C_3^+$ bar-g (30° C.) | Monomer Feed $C_2^-$ wt % | Monomer Feed $C_3^-$ wt % | Monomer Feed $C_2^-$ g | Monomer Feed $C_3^-$ g | Tot. solid g | split % wt II phase |
|---|---|---|---|---|---|---|---|---|---|
| 2 | 39 | 39 | 4.3 | 65 | 35 | 105 | 57 | 261 | 61 |
| 3 | 39 | 39 | 4.3 | 65 | 35 | 97 | 51 | 256 | 59 |
| 4 | 39 | 39 | 4.3 | 65 | 35 | 141 | 76 | 369 | 59 |
| 5 | 49 | 25* | 0 | 85 | 15* | 128 | 22* | 253 | 61 |
| 6 | 44 | 58* | 0 | 65 | 35* | 98 | 53* | 264 | 61 |
| 7 | 49 | 25* | 0 | 85 | 15* | 82 | 14* | 197 | 50 |
| 8 | 44 | 58* | 0 | 65 | 35* | 98 | 53* | 285 | 65 |
| 9 | 49 | 25* | 0 | 85 | 15* | 155 | 27* | 328 | 54 |
| 10 | 44 | 58* | 0 | 65 | 35* | 92 | 50* | 322 | 53 |
| 11 | — | 162 | — | — | 100 | — | 125 | 278 | 46 |
| 12 | — | 162 | — | — | 100 | — | 100 | 279 | 28 |
| 13 | — | 162 | — | — | 100 | — | 350 | 480 | 69 |
| 14 | — | 162 | — | — | 100 | — | 450 | 525 | 77 |
| 15 | — | 162 | — | — | 100 | — | 67 | 215 | 30 |
| 16 | — | 162 | — | — | 100 | — | 48 | 196 | 27 |

*1-butene

TABLE 4

| Property | Example 11 | Example 15 | Example 16 |
|---|---|---|---|
| XSRT (% wt) | 43 | — | 32.1 |
| $T_m$ (° C.) | 165 | — | 164 |
| ΔH (J/g) | 75 | — | 78 |
| $T_c$ (° C.) | 122 | — | 107 |
| I.V. (dL/g) | 2.23 | 1.74 | 1.51 |
| $M_w$ | 419 600 | — | — |
| $M_n$ | 33 300 | — | — |
| $M_w/M_n$ | 12.6 | — | — |
| mmmm | 43.5 | — | 56.9 |
| mm | 49.5 | — | 63.5 |
| rrrr | 18.8 | — | 6.6 |
| rr | 32.1 | — | 17.5 |

TABLE 5

| Property | Ex 12 | Ex 13 | Ex 14 |
|---|---|---|---|
| $T_m$ (° C.) | 165 | 167 | 164 |
| ΔH (J/g) | 84 | 37 | 31 |
| $T_c$ (° C.) | 113 | 110 | 108 |
| $T_g$ (° C.) | −2 | 1 | −1 |
| I.V. (dL/g) | 2.18 | 2.57 | 2.42 |
| Et$_2$O soluble (a) | 6.6 | 11.8 | 17.7 |
| hexane soluble (a) | 12.2 | 53.4 | 55.6 |
| mm | | | 8.9 |
| rrrr | | | 33.5 |
| rr | | | 57.9 |
| hexane insoluble | 81.2 | 34.8 | 26.7 |

(a) Kumagawa, 6 h at reflux.

The invention claimed is:

1. A process for the polymerization of olefins of formula CH$_2$=CHR, wherein R is hydrogen or an alkyl, cycloalkyl or aryl radical with 1-20 carbon atoms, comprising the following steps:
   a) a first step of polymerization wherein at least one of said olefins are polymerized, in at least one reactor, in the presence of a catalyst comprising the product of reaction between an alkyl-Al compound and (i) a solid component comprising a compound of a transition metal M$^I$ selected from the group consisting of Ti and V, not containing M$^I$-π bonds, and a halide of Mg in active form, or (ii) a Phillips catalyst to produce an olefin homo- or copolymer;
   b) a treatment step comprising:
      I. contacting the polymer produced in polymerization step a) with compounds that deactivate the catalyst used in said step a); and
      II. contacting the product obtained in I. with a solution comprising a compound of formula (I):

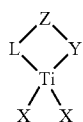

(I)

wherein:
Ti is titanium;
L is a group bonded to Ti through a π-bond;
Y is a moiety comprising nitrogen, phosphorus, sulfur or oxygen through which Y is covalently bonded to both Z and Ti;
Z is a moiety bridging L and Y,
X, same or different, are monovalent anionic moieties having up to 30 non-hydrogen atoms provided that, if X is an aromatic group, it is not bonded to Ti through a π-bond, optionally two X groups being covalently bonded together to form a divalent dianionic moiety having both valences bonded to Ti;
and, optionally, with an activating cocatalyst in hydrocarbon solvents; and
   c) a second step of polymerization wherein at least one olefin is polymerized, in at least one gas phase reactor, in the presence of the product obtained in the treatment step b);
and wherein the amount of homo- or copolymer of olefins produced in the first polymerization step a) is between 10% to 90% by weight of the total amount of polymer produced.

2. The process according to claim 1 wherein the compound used in the treatment step b) has formula (II)

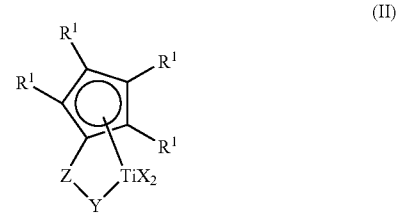

(II)

wherein:
Ti is titanium;
X, same or different, are hydrogen atoms, halogen atoms, —R$^2$, —OR$^2$, —OCOR$^2$, —OSO$_2$CF$_3$, —SR$^2$, —NR$^2_2$ and —PR$^2_2$ radicals, wherein R$^2$ is a linear or branched, saturated or unsaturated C$_1$-C$_{20}$ alkyl, C$_6$-C$_{20}$ aryl or C$_7$-C$_{20}$ arylalkyl radicals, optionally containing heteroatoms belonging to groups 13-17 of the Periodic Table of the Elements, two R$^2$ can also form a C$_4$-C$_7$ saturated or unsaturated ring;
Y is NR$^2$, PR$^2$, O or S;
Z is selected from the group consisting of R$^3_2$Si-SiR$^3_2$, R$^3_2$C-CR$^3_2$, R$^3_2$Si-CR$^3_2$, R$^3_2$Si and CR$^{32}$ radicals, wherein R$^3$ is a hydrogen atom or a linear or branched, saturated or unsaturated C$_1$-C$_{20}$ alkyl, C$_6$-C$_{20}$ aryl or C$_7$-C$_{20}$ arylalkyl radicals, optionally containing heteroatoms belonging to groups 13-17 of the Periodic Table of the Elements; two R$^3$ can also form a C$_4$-C$_7$ saturated or unsaturated ring;
the groups R$^1$, same or different, are hydrogen atoms, halogen atoms or a linear or branched, saturated or unsaturated C$_1$-C$_{20}$ alkyl, C$_6$-C$_{20}$ aryl or C$_7$-C$_{20}$ arylalkyl radicals, optionally containing heteroatoms belonging to groups 13-17 of the Periodic Table of the Elements, or two or more R$^1$ groups can also form a ring that can be saturated or unsaturated and can contain one or more heteroatoms belonging to groups 13-16 of the Periodic Table of the Elements, said rings can bear alkyl substituents.

3. The process according to claim 2 wherein in the compound of formula (II)
X is halogen atom, R$^2$ or OR$^2$; Y is selected from the group consisting of N-methyl, N-ethyl, N-n-propyl, N-isopropyl, N-n-butyl, N-t-butyl, N-phenyl, N-p-n-butyl-phenyl, N-benzyl, N-cyclohexyl and N-cyclododecyl radicals; Z is selected from the group consisting of dimethylsilyl, diphenylsilyl, diethylsilyl, di-n-propylsilyl, di-isopropylsilyl, di-n-butyl-silyl, di-t-butyl-silyl, di-n-hexylsilyl, ethylmethylsilyl, n-hexylmethylsilyl, cyclopentamethylenesilyl, cyclotetramethylenesilyl, cyclotrimethylenesilyl, methylene, dimethylmethylene and diethylmethylene radicals wherein N is nitrogen.

4. The process according to claim 1 wherein the compounds used in the treatment step b) have the formula (III):

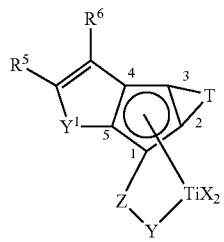

(III)

wherein $Y^1$ is $NR^2$, an oxygen (O), $PR^2$ or a sulfur atom(S), wherein $R^2$ is a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements;

the groups R5 and $R^6$, same or different, are hydrogen atoms, halogen atoms or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements; or $R^5$ and $R^6$ can also join to form a $C_4$-$C_7$ saturated or unsaturated ring;

T is a moiety of formula (IIIa) or (IIIb):

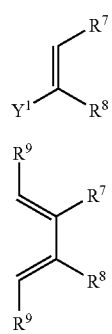

(IIIa)

(IIIb)

wherein in IIIa, $Y^1$ is bonded to the cyclopenatadienyl group in position 2, and the unsaturated carbon bonded to $R^7$ is bonded to the cyclopentadienyl group in position 3, and in IIIb, one unsaturated carbon bonded to $R^9$ is bonded to the cyclopentadienyl at position 2 and the other unsaturated carbon bonded to $R^9$ is bonded to the cyclopentadienyl at position 3;

the groups $R^7$, $R^8$ and $R^9$, same or different, are hydrogen atoms, halogen atoms or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, or $R^9$ and $R^7$, $R^7$ and $R^8$ or $R^8$ and $R^9$ form together a condensed $C_4$-$C_7$ ring that can bear alkyl substituents.

5. The process according to claim 4 wherein the compounds used in the treatment step b) have the formula (IV):

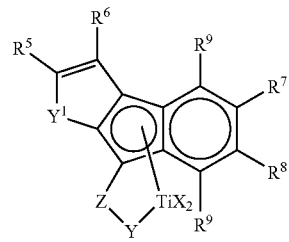

(IV)

with the proviso that $R^5$ and $R^6$ do not form a condensed aromatic or aliphatic $C_4$-$C_7$ ring.

6. A process for the polymerization of olefins of formula $CH_2$=CHR, wherein R is hydrogen or an alkyl, cycloalkyl or aryl radical with 1-20 carbon atoms, comprising the following steps:

a) a first step of polymerization wherein at least one of said olefins are polymerized, in at least one reactor, in the presence of a catalyst comprising the product of reaction between an alkyl-Al compound and (i) a solid component comprising a compound of a transition metal $M^I$ selected from the group consisting of Ti and V, not containing $M^I$-π bonds, and a halide of Mg in active form, or (ii) a Phillips catalyst to produce an olefin homo- or copolymer;

b) a treatment step comprising:
   I. contacting the polymer produced in polymerization step a) with compounds that deactivate the catalyst used in said step a); and
   II. contacting the product obtained in I. with a solution comprising a compound of formula (IV):

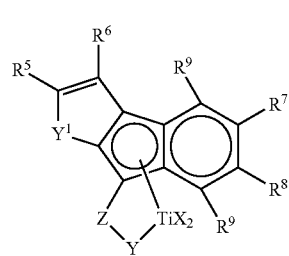

(IV)

wherein:
Ti is titanium;
Z is selected from the group consisting of $R^3_2$Si-Si$R^3_2$, $R^3_2$C-C$R^3_2$, $R^3_2$Si-C$R^3_2$, $R^3_2$Si and C$R^3_2$ radicals, wherein $R^3$ is a hydrogen atom or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements; two $R^3$ can also form a $C_4$-$C_7$ saturated or unsaturated ring;
Y is a moiety comprising nitrogen, phosphorus, sulfur or oxygen through which Y is covalently bonded to both Z and Ti;
$Y^1$ is N-methyl, N-ethyl or N-phenyl radical, wherein N is nitrogen; $R^5$ is a hydrogen atom or a methyl, ethyl, propyl or phenyl radical; $R^6$ is a hydrogen atom or methyl or phenyl radical; and $R^7$, $R^8$ and $R^9$ are hydrogen atoms, with the proviso that $R^5$ and $R^6$ do not form a condensed aromatic or aliphatic $C_4$-$C_7$ ring;

X, same or different, are monovalent anionic moieties having up to 30 non-hydrogen atoms provided that, if X is an aromatic group, it is not bonded to Ti through a π-bond, optionally two X groups being covalently bonded together to form a divalent dianionic moiety having both valences bonded to Ti; and, optionally, with an activating cocatalyst in hydrocarbon solvents; and c) a second step of polymerization wherein at least one olefin is polymerized, in at least one reactor, in the presence of the product obtained in the treatment step b);

and wherein the amount of homo- or copolymer of olefins produced in the first polymerization step a) is between 10% to 90% by weight of the total amount of polymer produced.

7. A process for the polymerization of olefins of formula $CH_2$=CHR, wherein R is hydrogen or an alkyl, cycloalkyl or aryl radical with 1-20 carbon atoms, comprising the following steps:

a) a first step of polymerization wherein at least one of said olefins are polymerized, in at least one reactor, in the presence of a catalyst comprising the product of reaction between an alkyl-Al compound and (i) a solid component comprising a compound of a transition metal $M^I$ selected from the group consisting of Ti and V, not containing $M^I$-π bonds, and a halide of Mg in active form, or (ii) a Phillips catalyst to produce an olefin homo- or copolymer;

b) a treatment step comprising:
  I. contacting the polymer produced in polymerization step a) with compounds that deactivate the catalyst used in said step a); and
  II. contacting the product obtained in I. with a solution comprising a compound of formula (V):

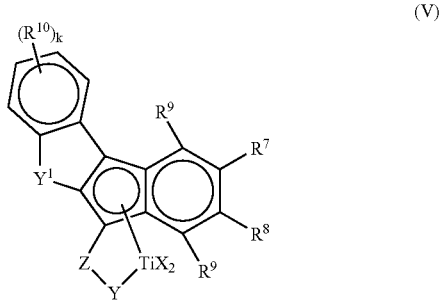

(V)

wherein k ranges from 0 to 4 and $R^{10}$ is a halogen atom or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, or two vicinal $R^{10}$ groups form together a condensed aromatic or aliphatic $C_4$-$C_7$ ring;

the groups $R^7$, $R^8$ and $R^9$, same or different, are hydrogen atoms, halogen atoms or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, or $R^9$ and $R^7$, $R^7$ and $R^8$ or $R^8$ and $R^9$ form together a condensed $C_4$-$C_7$ ring that can bear alkyl substituents;

Ti is titanium;

Z is selected from the group consisting of $R^3{}_2Si$-$SiR^3{}_2$, $R^3{}_2C$-$CR^3{}_2$, $R^3{}_2Si$-$CR^{32}$, $R^3{}_2Si$ and $CR^3{}_2$ radicals wherein $R^3$ is a hydrogen atom or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements; two $R^3$ can also form a $C_4$-$C_7$ saturated or unsaturated ring;

Y is a moiety comprising nitrogen, phosphorus, sulfur or oxygen through which Y is covalently bonded to both Z and Ti;

$Y^1$ is $NR^2$, an oxygen (O), $PR^2$ or a sulfur atom (S), wherein $R^2$ is a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, two $R^2$ can also form a $C_4$-$C_7$ saturated ring;

X, same or different, are monovalent anionic moieties having up to 30 non-hydrogen atoms provided that, if X is an aromatic group, it is not bonded to Ti through a π-bond, optionally two X groups being covalently bonded together to form a divalent dianionic moiety having both valences bonded to Ti;

and, optionally, with an activating cocatalyst in hydrocarbon solvents; and c) a second step of polymerization wherein at least one olefin is polymerized, in at least one reactor, in the presence of the product obtained in the treatment step b);

and wherein the amount of homo- or copolymer of olefins produced in the first polymerization step a) is between 10% to 90% by weight of the total amount of polymer produced.

8. The process according to claim 7 wherein in the compounds of formula (V), $Y^1$ is N-methyl, N-ethyl or N-phenyl radical, wherein N is nitrogen; k is 0 or 1 and $R^{10}$ is a 2-methyl, 2-isopropyl or 2-tert-butyl radical; and $R^7$, $R^8$ and $R^9$ are hydrogen atoms.

9. A process for the polymerization of olefins of formula $CH_2$=CHR, wherein R is hydrogen or an alkyl, cycloalkyl or aryl radical with 1-20 carbon atoms, comprising the following steps:

a) a first step of polymerization wherein at least one of said olefins are polymerized, in at least one reactor, in the presence of a catalyst comprising the product of reaction between an alkyl-Al compound and (i) a solid component comprising a compound of a transition metal $M^I$ selected from the group consisting of Ti and V, not containing $M^I$-π bonds, and a halide of Mg in active form, or (ii) a Phillips catalyst to produce an olefin homo- or copolymer;

b) a treatment step in which the product obtained in the first step of polymerization is contacted with a compound that deactivates the catalyst present in the first polymerization step and thereafter it is contacted with a catalyst system comprising a compound of formula (VI):

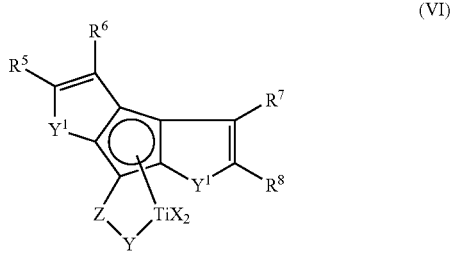

(VI)

wherein $Y^1$ is $NR^2$, an oxygen atom (O), $PR^2$ or a sulfur atom(S) wherein $R^2$ is a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements;

Z is selected from the group consisting of $R^3{}_2Si$-$SiR^3{}_2$, $R^3{}_2C$-$CR^3{}_2$, $R^3{}_2Si$-$CR^3{}_2$, $R^3{}_2Si$ and $CR^3{}_2$ radicals, wherein $R^3$ is a hydrogen atom or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements; two $R^3$ can also form a $C_4$-$C_7$ saturated or unsaturated ring;

Y is a moiety comprising nitrogen, phosphorous, sulfur or oxygen through which Y is covalently bonded to both Z and Ti;

Ti is titanium;

X, same or different, are monovalent anionic moieties having up to 30 non-hydrogen atoms provided that, if X is an aromatic group, it is not bonded to Ti through a π-bond, optionally two X groups being covalently bonded together to form a divalent dianoionic moiety having both valences bonded to Ti;

the groups $R^5$ and $R^6$, same or different, are hydrogen atoms, halogen atoms or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements; or $R^5$ and $R^6$ can also join to form a C4-C7 saturated or unsaturated ring;

the groups $R^7$ and $R^8$, same or different, are hydrogen atoms, halogen atoms or a linear or branched, saturated or unsaturated $C_1$-$C_{20}$ alkyl, $C_6$-$C_{20}$ aryl or $C_7$-$C_{20}$ arylalkyl radicals, optionally containing heteroatoms belonging to groups 13-17 of the Periodic Table of the Elements, or $R^7$ and $R^8$ form together a condensed $C_4$-$C_7$ ring that can bear alkyl substituents.

10. The process according to claim 9 wherein in the compounds of formula (VI), two $Y^1$ are the same; $R^5$ is hydrogen atom or a methyl, ethyl, propyl or phenyl radical; and $R^6$ is a hydrogen atom or $R^5$ and $R^6$ form a condensed benzene ring that can bear alkyl substituents; $R^7$ is a hydrogen atom and $R^8$ is a hydrogen atom or a methyl, ethyl, propyl or phenyl radical or $R^7$ and $R^8$ form a condensed benzene ring that can bear alkyl substituents.

11. The process according to claim 1 wherein in step II the polymer produced in step a) is suspended in an hydrocarbon solvent containing dissolved therein the compound of formula (I) and optionally one or more activating cocatalyst, and removing the solvent at the end of the treatment.

12. The process according to claim 1 wherein step II is carried out in a loop reactor in the gas-phase, wherein the polymer produced in the first step of polymerization (a) is circulated by a stream of inert gas, and a solution of the compound of formula (I) is fed, thereby obtaining a free-flowing product at the end of the treatment.

13. The process according to claim 1 wherein the polymer obtained in step a) has a porosity, expressed as percentage of voids, greater than 15%.

14. A process for the polymerization of olefins of formula $CH_2$=CHR, wherein R is hydrogen or an alkyl, cycloalkyl or aryl radical with 1-20 carbon atoms, comprising the following steps:

a) a first step of polymerization wherein at least one of said olefins are polymerized, in at least one reactor, in the presence of a catalyst comprising the product of reaction between an alkyl-Al compound and (i) a solid component comprising a compound of a transition metal $M^I$ selected from the group consisting of Ti and V, not containing $M^I$-π bonds, and a halide of Mg in active form, or (ii) a Phillips catalyst to produce an olefin homo- or copolymer;

b) a treatment step in which the product obtained in the first step of polymerization is contacted with a compound that deactivates the catalyst present in the first polymerization step and thereafter it is contacted with a catalyst system comprising a compound of formula (I):

(I)

wherein:

Ti is titanium;

L is a group bonded to Ti through a π-bond;

Y is a moiety comprising nitrogen, phosphorus, sulfur or oxygen through which Y is covalently bonded to both Z and Ti;

Z is a moiety bridging L and Y,

X, same or different, are monovalent anionic moieties having up to 30 non-hydrogen atoms provided that, if X is an aromatic group, it is not bonded to Ti through a π-bond, optionally two X groups being covalently bonded together to form a divalent dianionic moiety having both valences bonded to Ti; and, optionally, with an activating cocatalyst; and c) a second step of polymerization wherein at least one olefin is polymerized, in at least one reactor, in the presence of the product obtained in the treatment step b);

and wherein the amount of homo- or copolymer of olefins produced in the first polymerization step a) is between 20% to 70% by weight of the total amount of polymer produced; wherein the polymer obtained in step a) is a homopolymer of propylene having a pentads content (mmmm) higher than 60%, or a crystalline copolymer of propylene that has a content by weight of units derived from ethylene, the $CH_2$=CHR olefin, or mixtures thereof below 10%, and a porosity, expressed as percentage of voids, greater than 15%.

15. A process for the polymerization of olefins of formula $CH_2\!=\!CHR$, wherein R is hydrogen or an alkyl, cycloalkyl or aryl radical with 1-20 carbon atoms, comprising the following steps:
- a) a first step of polymerization wherein at least one of said olefins are polymerized, in at least one reactor, in the presence of a catalyst comprising the product of reaction between an alkyl-Al compound and (i) a solid component comprising a compound of a transition metal $M^I$ selected from the group consisting of Ti and V, not containing $M^I$-π bonds, and a halide of Mg in active form, or (ii) a Phillips catalyst to produce an olefin homo- or copolymer;
- b) a treatment step in which the product obtained in the first step of polymerization is contacted with a compound that deactivates the catalyst present in the first polymerization step and thereafter it is contacted with a catalyst system comprising a compound of formula (I):

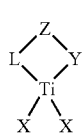

(I)

wherein:

Ti is titanium;

L is a group bonded to Ti through a π-bond;

Y is a moiety comprising nitrogen, phosphorus, sulfur or oxygen through which Y is covalently bonded to both Z and Ti;

Z is a moiety bridging L and Y,

X, same or different, are monovalent anionic moieties having up to 30 non-hydrogen atoms provided that, if X is an aromatic group, it is not bonded to Ti through a π-bond, optionally two X groups being covalently bonded together to form a divalent dianionic moiety having both valences bonded to Ti;

and, optionally, with an activating cocatalyst; and

- c) a second step of polymerization wherein at least one olefin is polymerized, in at least one reactor, in the presence of the product obtained in the treatment step b);

and wherein the amount of homo- or copolymer of olefins produced in the first polymerization step a) is between 10% to 90% by weight of the total amount of polymer produced, and the polymer obtained in step c) is a polypropylene polymer having a triad contents (rr) in the range 60-80% by mol and melting enthalpy (ΔHf) lower than 20 J/g.

16. A reactor blend comprising:
- (a) from 10% to 90% by weight of isotactic polypropylene, optionally containing from 0.1 to 5% by mol of units derived from an alpha-olefin of formula $CH_2\!=\!CHR^{III}$, wherein $R^{III}$ is hydrogen or a $C_2$-$C_{20}$ alkyl radical, having a pentads content (mmmm) higher than 60%; and
- (b) from 90% to 10% by weight of a syndiotactic/amorphous polypropylene, optionally containing from 0.1 to 5% by mol of units derived from an alpha-olefin of formula $CH_2\!=\!CHR^{III}$, wherein $R^{III}$ is hydrogen or a $C_2$-$C_{20}$ alkyl radical, having triad contents (rr) in the range 60-80% and melting enthalpy (ΔHf) lower than 20 J/g wherein the reactor blend is obtained by a process for the polymerization of olefins of formula $CH_2\!=\!CHR$, wherein R is hydrogen or an alkyl, cycloalkyl or aryl radical with 1-20 carbon atoms, the process comprising the following steps:
- a) a first step of polymerization wherein at least one of said olefins are polymerized, in at least one reactor, in the presence of a catalyst comprising the product of reaction between an alkyl-Al compound and (i) a solid component comprising a compound of a transition metal $M^I$ selected from the group consisting of Ti and V, not containing $M^I$-π bonds, and a halide of Mg in active form, or (ii) a Phillips catalyst to produce an olefin homo- or copolymer;
- b) a treatment step comprising:
  - I. contacting the polymer produced in polymerization step a) with compounds that deactivate the catalyst used in said step a); and
  - II. contacting the product obtained in I. with a solution comprising a compound of formula (I):

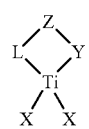

(I)

wherein:

Ti is titanium;

L is a group bonded to Ti through a π-bond;

Y is a moiety comprising nitrogen, phosphorus, sulfur or oxygen through which Y is covalently bonded to both Z and Ti;

Z is a moiety bridging L and Y,

X, same or different, are monovalent anionic moieties having up to 30 non-hydrogen atoms provided that, if X is an aromatic group, it is not bonded to Ti through a π-bond, optionally two X groups being be covalently bonded together to form a divalent dianionic moiety having both valences bonded to Ti;

and, optionally, with an activating cocatalyst; and

- c) a second step of polymerization wherein at least one olefin is polymerized, in at least one reactor, in the presence of the product obtained in the treatment step b);

and wherein the amount of homo- or copolymer of olefins produced in the first polymerization step a) is between 10% to 90% by weight of the total amount of polymer produced.

* * * * *